United States Patent [19]

Breeden et al.

[11] Patent Number: 5,274,368
[45] Date of Patent: Dec. 28, 1993

[54] METHOD AND APPARATUS FOR CONTROLLING ACCESS TO A COMMUNICATION SYSTEM

[75] Inventors: Robert L. Breeden; Prabhakar Muppidi, both of Boynton Beach, Fla.

[73] Assignee: Motorola, Inc., Schaumburg, Ill.

[21] Appl. No.: 945,995

[22] Filed: Sep. 15, 1992

Related U.S. Application Data

[63] Continuation of Ser. No. 656,659, Feb. 15, 1991, abandoned.

[51] Int. Cl.⁵ .................. H04Q 1/00; G06F 7/04; H04M 11/02; G08B 23/00
[52] U.S. Cl. .................. 340/825.31; 340/825.34; 340/528; 379/63
[58] Field of Search .............. 340/825.31, 825.34, 340/825.32, 528; 379/59, 60, 62, 63

[56] References Cited

U.S. PATENT DOCUMENTS

| | | | |
|---|---|---|---|
| 4,378,551 | 3/1983 | Drapac | 340/825.32 |
| 4,626,845 | 12/1986 | Ley | 340/825.34 |
| 4,672,376 | 6/1987 | Lewiner et al. | 340/825.31 |
| 4,677,434 | 6/1987 | Fascenda | 340/825.31 |
| 4,682,351 | 7/1987 | Makino | 379/62 |
| 5,012,234 | 4/1991 | Dulaney et al. | 340/825.31 |
| 5,058,201 | 10/1991 | Ishii et al. | 379/60 |
| 5,060,263 | 10/1991 | Bosen et al. | 340/825.31 |

Primary Examiner—Donald J. Yusko
Assistant Examiner—Brian Zimmerman
Attorney, Agent, or Firm—Thomas G. Berry; Daniel R. Collopy

[57] ABSTRACT

A communication system base site (300) receives a signal (400) representing a request from a communication unit (200) to access the communication system (100). The signal includes an identification code (402) and another code which represents when the communication unit was authorized to access the communication system (410). The base site (300) operates to process the identification code (402) to initially determine that the communication unit (200) should not be permitted access to the communication system (100). Additionally, the other code (410) is processed to determine whether the communication unit (200) was authorized to access the communication system (100) within a time interval. If so, the communication unit (200) is permitted to access the communication system.

35 Claims, 4 Drawing Sheets

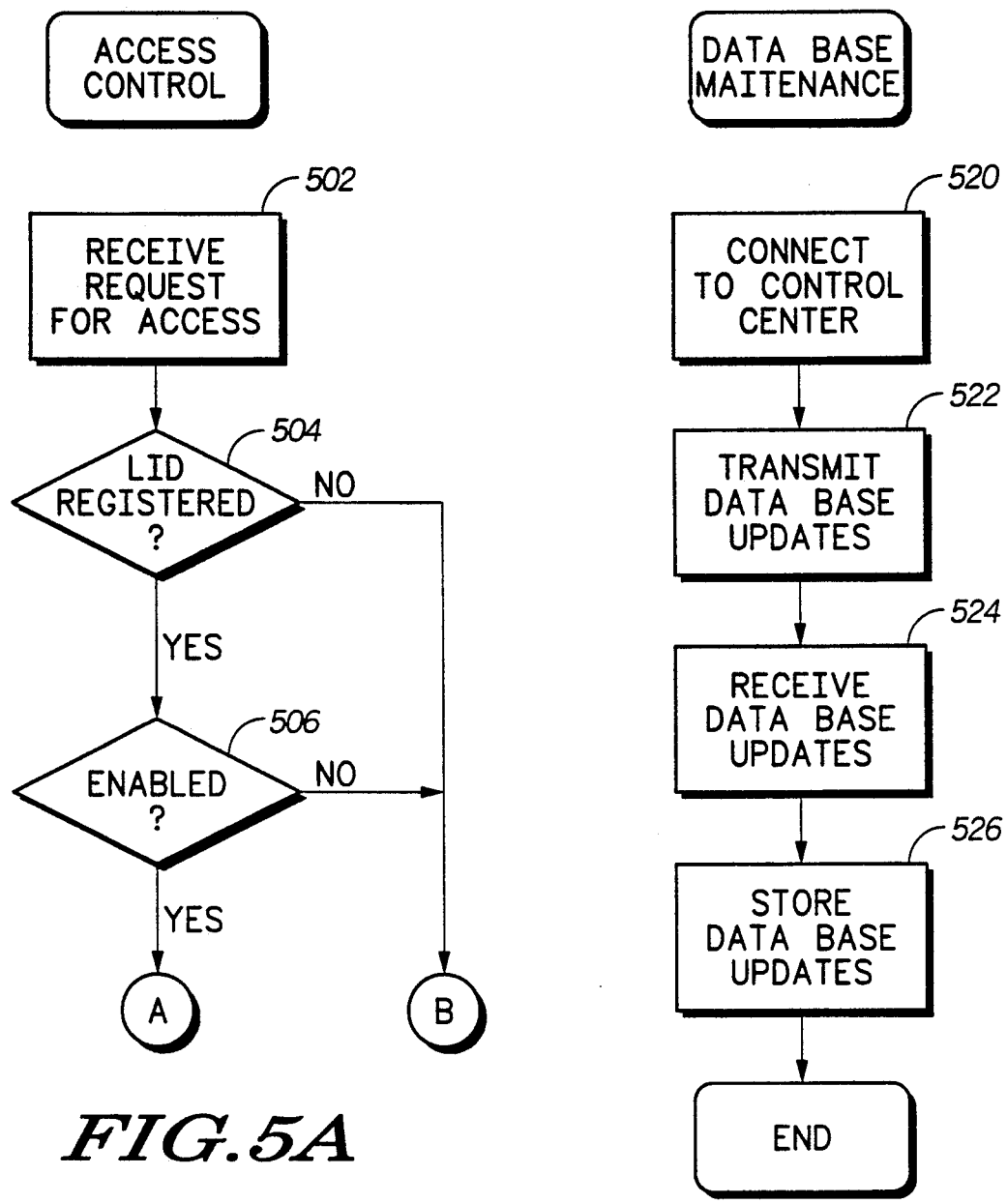
FIG.5A
FIG.5C
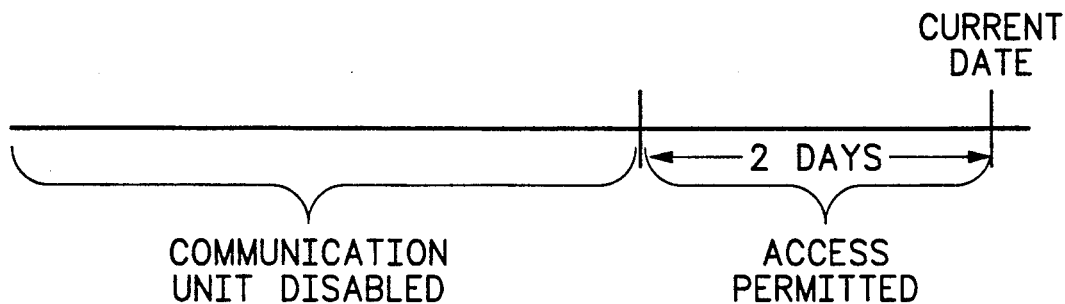
FIG.6

METHOD AND APPARATUS FOR CONTROLLING ACCESS TO A COMMUNICATION SYSTEM

This is a continuation of application Ser. No. 656,659, filed Feb. 15, 1991 and now abandoned.

FIELD OF THE INVENTION

This invention relates in general to communication systems, and more particularly to those communication systems that employ some type of access control criteria to regulate access to the communication system.

BACKGROUND OF THE INVENTION

Historically, several types of communication systems have employed some type of access control criteria to regulate access to the communication system. For example, computer systems are known to use passwords entered on a terminal or the like by an individual desiring to utilize the computer system. Also, selective call receivers (e.g., pagers) can be disabled via a command transmitted from a paging service provider to prevent stolen receivers and those individuals that do not pay their bill from receiving messages from the communication system.

The decision to disable a communication unit or deny access to a communication system is a serious consideration for communication service providers. The problems associated with this decision are reduced in a more centralized communication system, where the information used to make the deny/disable decision can be more rapidly updated and more readily controlled and maintained. Conversely, these problems are more profound in distributed or decentralized communication systems since the information used to make the deny/disable decision must be distributed and cannot be as carefully controlled or as rapidly updated.

These problems generally manifest themselves to the users of the communication system in the form of improvidently disabled communication units and/or unjustified denial of communication services. Naturally, such occurrences tend to cause friction between the communication service providers and the users of the communication systems. Accordingly, a need exists to prevent inappropriate disablement of communication units and improper denial of communication services.

SUMMARY OF THE INVENTION

Briefly, according to the invention, a communication system base site receives a signal representing a request from a communication unit to access the communication system. The signal includes an identification code and another code which represents when the communication unit was authorized to access the communication system. The base site operates to process the identification code to initially determine that the communication unit should not be permitted access to the communication system. Additionally, the other code is processed to determine whether the communication unit was authorized to access the communication system within a time interval. If so, the communication unit is permitted to access the communication system.

BRIEF DESCRIPTION OF THE DRAWINGS

FIGS. 5a-5c are flow diagrams illustrating the operation of the base sites of FIG. 3.

FIG. 6 is an illustration to facilitate understanding the present invention.

DESCRIPTION OF A PREFERRED EMBODIMENT

Figure 1:
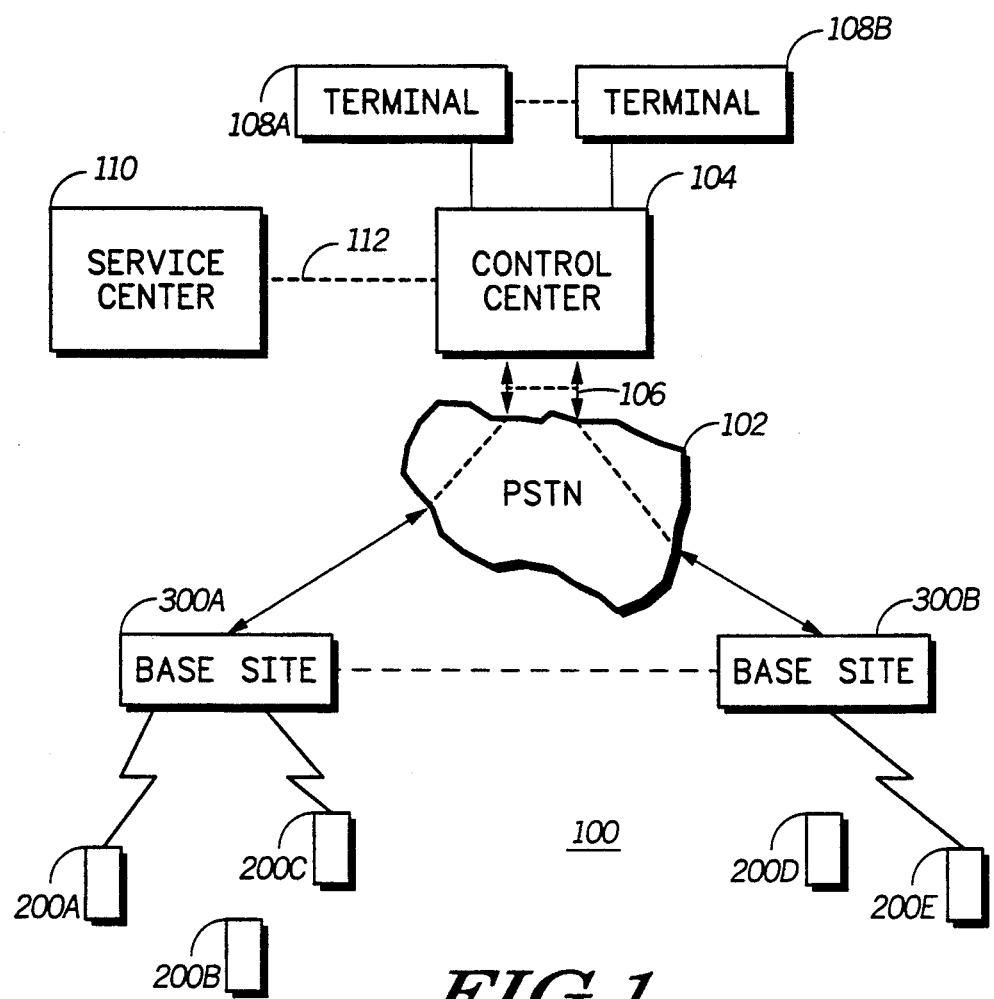
FIG. 1 is a block diagram of a communication system suitable for employing an embodiment of the present invention.

FIG. 1 illustrates a communication system 100 suitable for employing the present invention. In the preferred embodiment, the communication system 100 comprises a second generation cordless telephone system commonly referred to as "CT-2" by those skilled in the art. As will be appreciated from the following, the present invention can apply to a CT-2 communication system based upon the CT-2 Common Air Interface (CAI) Standard, or a derivative thereof, as well as find application in any number of different types of communication systems.

As can be seen in FIG. 1, a CT-2 communication system is centered about a conventional public or private switched telephone network (PSTN) 102. A communication service provider controls the system via one or more terminals 108a-b coupled to a control center 104, which in turn is coupled to a plurality of base sites 300a-b through one or more telephone type communication channels (lines) 106. The base sites 300a-b are distributed throughout the communication system to provide a wide area communication service. As is typical of a CT-2 communication system, the preferred base sites are capable of communicating on forty different communication channels, although in practice only twenty channels are used at any given time to minimize adjacent channel interference. The base sites also maintain a record of usage of the communication system by each of the communication units, which is transmitted periodically to the control center 104 for billing purposes.

A plurality of communication units 200a-e are free to roam within the communication system coverage area and communicate with other individuals having access to conventional public or private wireline telephone sets or the like. To gain access to the communication system the communication units are required to request access to the communication system by transmitting a request signal to the nearest base site (i.e., communication units 200a-c to base site 300a, and communication units 200d-e to base site 300b). If a channel is available at a base site receiving a request to access the communication system 100, the communication unit will be permitted to communicate provided that the communication unit is registered on the communication system and has not been previously disabled or identified as a communication unit that should be disabled. That is, if an individual informs the service provider that his or her communication unit has been stolen, the service provider can enter the identification code of the stolen communication unit into the control center for distribution to the various base sites at the next update interval. In the preferred embodiment, the update interval occurs once a day (24 hours) at an appropriate off-peak hour of the PSTN. Thereafter, if the stolen communication unit is used to gain access to the communication system, it will automatically be disabled by a base site. In a similar manner, the service provider can disable a communication unit whose user has not paid the service charge for using the communication system. During the next periodic update interval each base site 300a-b reports which communication units were disabled to the control center 104. At the next subsequent update interval, the control center 104 will distribute the identification of the disabled communication units to the plurality of base sites.

While not immediately apparent, the foregoing description contains a rather serious customer problem for providers of communication services. That is, a customer having a disabled communication unit must wait up to two days before he or she can communicate on the system again. This is true even if the stolen communication unit is immediately recovered, or the delinquent bill immediately paid. The reason for this problem results from the infrequent update interval used in a distributed communication system such as a CT-2 system. For example, assume that the owner of a disabled communication unit proceeds to a local service center 110 immediately upon discovering that his or her communication unit is disabled. After insuring that the account is in order, the service center reprograms or otherwise re-enables the communication unit. However, the base sites will not be informed that the communication unit should be permitted to access the communication for two days: one day for a base unit report that the communication unit was disabled, and a second day for the control center to distribute the disabling of the communication unit to the other base sites causing them to remove the communications unit's identity from a disable list. Thus, as soon as the customer attempts to use the just re-enabled communication unit, it will be again disabled forcing the customer to return to the service center 110.

Generally, such an inconvenience will not be tolerated by customers who feel that they should have instant access to the communication system if their account is in order. Of course, the inconvenience could be reduced if the service center 110 communicated directly to the control center (such as via channel 112), but this would still require an approximately one day wait period. Further reduction in the wait period is more difficult to achieve since it is typically impractical to directly communicate with all of the several base sites to update every disable list in each base site every time a communication unit is re-enabled. As will be hereinafter be apparent to those skilled in the art, the present invention solves this problem and permits immediate customer access to the communication system 100.

Figure 2:
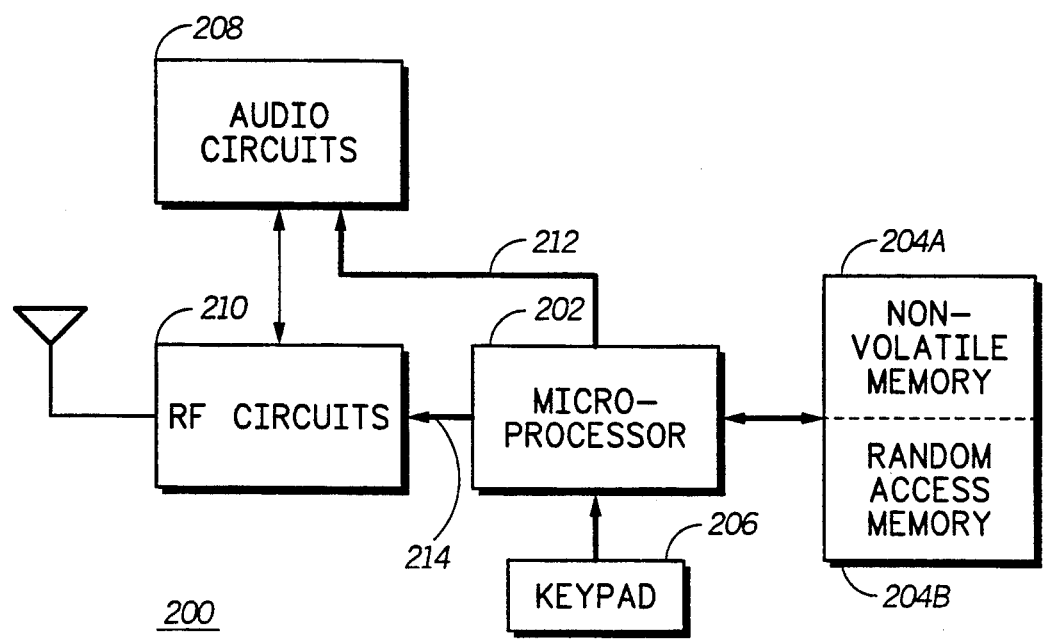
FIG. 2 is a block diagram of a communication unit of FIG. 1.

Referring to FIG. 2, a communication unit 200 preferably comprises a CT-2 compatible transceiver constructed and arranged to comply with the CT-2 time division duplex (TDD) CAI or any other protocol that may be used in any particularly implementation of a communication system. The preferred communication unit 200 operates under control of a microprocessor (or microcontroller or equivalent) 202 coupled to non-volatile memory 204a and random access memory 204b. To communicate via the communication unit, the user first activates the communication unit via a switch on a keypad 206. Automatically, the communication unit contacts the nearest base site in accordance with the CT-2 CAI protocol to be hereinafter discussed. After receiving a dial tone, the user of the communication unit selects (dials) a number associated with the person to whom he or she desires to communicate via the keypad 206. Once a communication channel has been established through the PSTN, the user can speak to and hear the called party via the audio circuits 208 and the radio frequency (RF) circuits 210, which are controlled by the microprocessor 202 via control lines 212 and 214 respectively.

Figure 3:
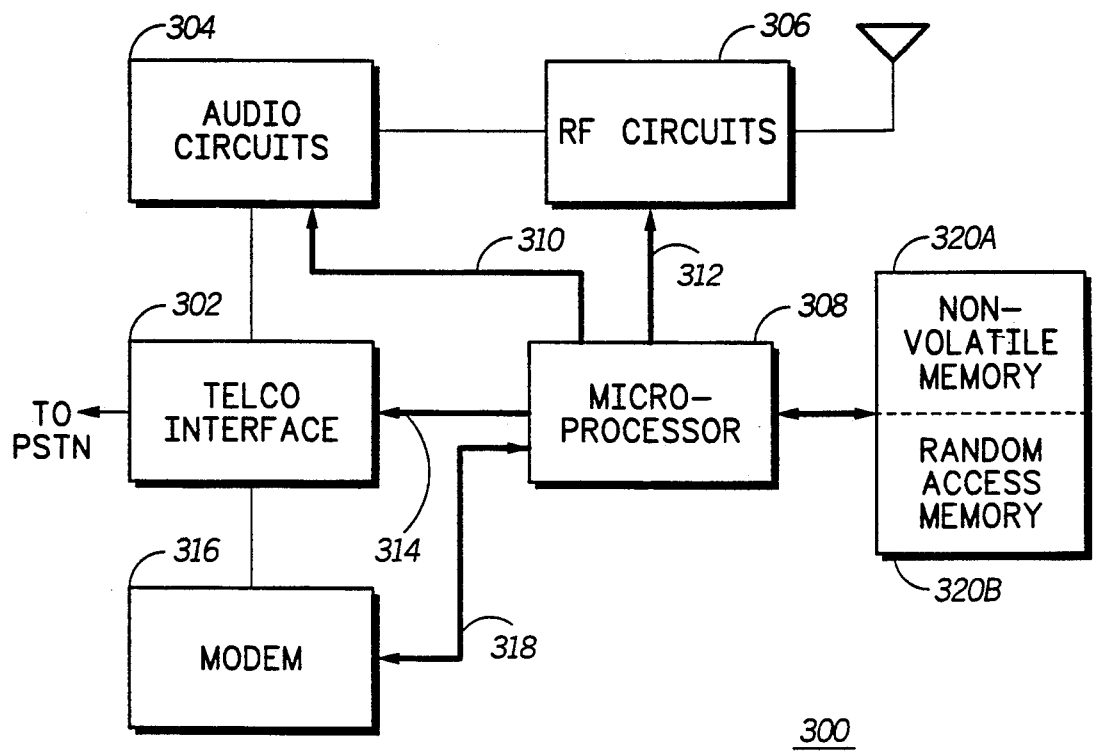
FIG. 3 is a block diagram of a base site of FIG. 1.

Referring to FIG. 3, a preferred embodiment of a base site 300 is illustrated in block diagram form. As discussed in conjunction with FIG. 1, the base site is coupled to the PSTN (via a telco type interface 302 in the preferred embodiment) to allow customers to communicate with other individuals and to allow the base site to communicate with the control center. When communicating with a communication unit, the PSTN is coupled through the telco interface 302 to audio circuits 304 and RF circuits 306, which are controlled by a microprocessor (or microcontroller or the like) 308 via control lines 310 and 312 respectively. The system usage of each customer is monitored by the microprocessor 308, and a data base is maintained in the non-volatile memory portion 302a of the memory 320. Additionally, the memory 320a contains the list of communication units to be disabled, the list of communication units that have been disabled, and any other system control parameters as may be implemented in any given communication system. Conversely, the telco interface 302 is controlled (via control line 314) to couple the PSTN to a modem (or equivalent) 316, which is coupled to the microprocessor 308 via data line(s) 318. In this way, the control center can receive and send updates to the disable list, billing information, and other system parameters during the periodic data base updates.

Figure 4:
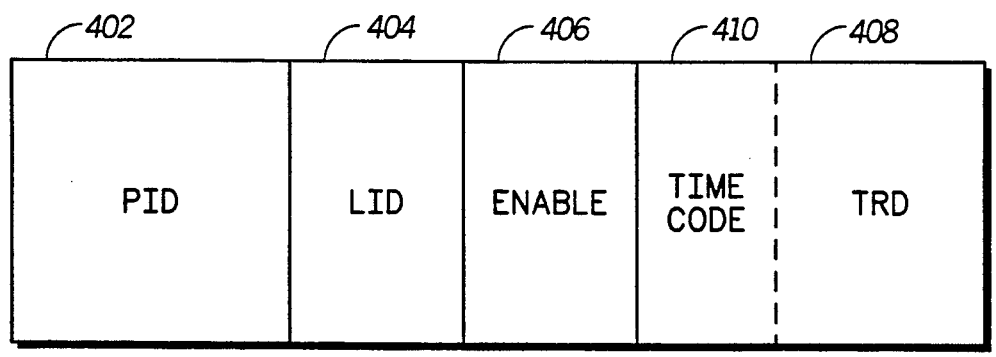
FIG. 4 is an illustration of a request for access to the communication system in accordance with the present invention.

FIG. 4 illustrates the preferred request signal 400 transmitted by a communication unit 200 to the nearest base unit 300 to request access to the communication system. As will be readily apparent to those skilled in the art, the request signal 400 is compliant with the CT-2 CAI, which is the preferred embodiment of the communication system 100. The request signal 400 is arranged into four primary portions of fields. One field 402 contains information representing the unique portable identification (PID) code assigned to the communication unit. In the preferred embodiment, the PID is twenty-seven bits in length to allow over two million different communication unit identification codes. Another field is preferably sixteen bits in length and contains information representing the link identification (LID) code 404 assigned to the provider of the communication service. Ordinarily, absent a roaming arrangment with another service provider, a service provider will only allow communication units associated with his or her communication service to access the communication system. Thus, a LID is typically programmed into the non-volatile memory of each communication unit. Another field comprises an enable field 406, which preferably is four bits in length and indicates whether the communication unit is currently enabled to access the communication system. When a communication unit is enabled and disabled, it is this field that is updated to reflect the current status of the communication unit. Finally, the request signal includes a telepoint registration data (TRD) field 408, which is preferably embodied as twenty binary coded decimal (BCD) digits that may be used in any convenient manner by the service providers.

According to the invention, four of the twenty BCD digits are reserved to form a time code 410, which is maintained by the microprocessor of the communication unit 200. The time code represents the time interval since the last enablement of the communication unit. That is, when the enable field is updated to reflect an enabled status of the communication unit, the time code is thereafter maintained to represent the time interval since the status change. In the preferred embodiment, the time increment represents days, although weeks, hours, half-hours, or minutes could be used. With four BCD digits, a communication unit in accordance with the preferred embodiment can measure in excess of twenty-five years from the last enabling status change. Other arrangements are, of course, possible depending upon the number of reserved BCD digits and the increment interval selected. In the preferred embodiment, the time code is maintained by any of several known software timing routines, but could also be implemented via a hardware timer as those skilled in the art will readily appreciate.

Figure 5B:
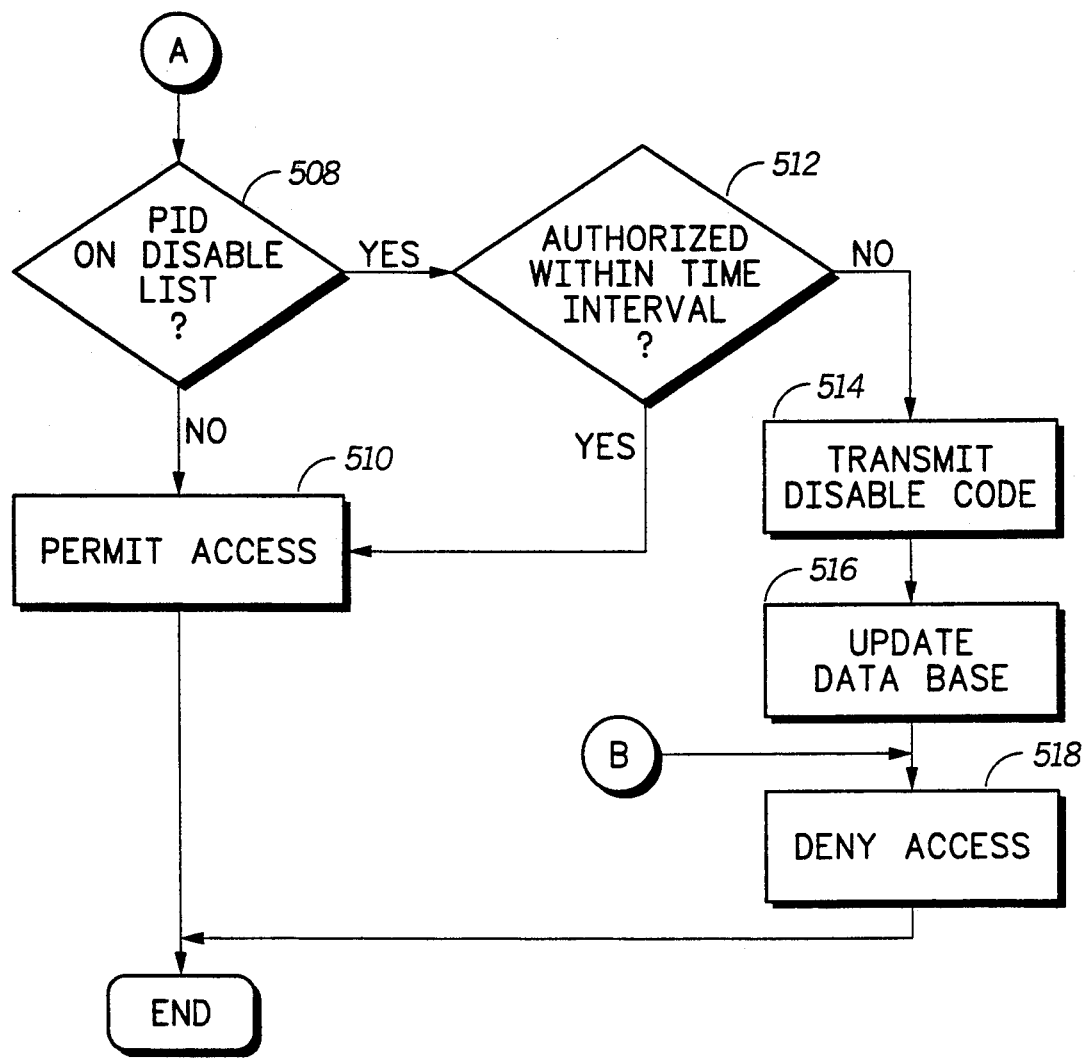

Referring to FIGS. 5a and 5b, the operation of the base sites 300 to control access to the communication system in accordance with the present invention can be understood. In step 502, a base site 300 receives the request signal 400 from a communication unit 200. Decision 504 determines whether the communication unit's LID is registered to the service provider's communication system. Failure of the communication unit's LID to be registered results in denial of access to the communication services (step 518). Assuming that the correct LID was received, the base site 300 next examines the enable field 406 of the request signal 400 (decision 506). As might be expected, if the communication unit has already been disabled, access to the communication services is denied (step 518). Assuming, however, that the communication unit was enabled, decision 508 attempts to correlate the PID of the communication unit with the identification codes of those communication units that the service provider has decided should be disabled. If the PID of the access requesting communication unit is not found on the disable list, the communication unit is permitted to access the communication system (step 510), and the communication system 100 operates normally to monitor the system usage to collect billing information or other system performance parameters. Conversely, if the PID of the communication unit was found on the disable list, the present invention examines the time code 410 of the request signal 400 to determine whether the communication unit was recently enabled (or re-enabled) within a time interval, which in the preferred embodiment is set at the two day time interval necessary to complete updating of the data bases in all of the various base sites of the communication system 100. If the time code represents a time interval longer than the threshold limit of two days, the communication unit must be scheduled to be disabled otherwise the PID would have been deleted via ordinary data base management. Therefore, the base site transmits a disable code (step 516) to the communication unit, which causes the enable field 406 to be altered to reflect a disabled communication status. After disabling the communication unit, the base site operates to remove the communication unit's PID from the disable list (since it was just disabled) and store the communication unit's in a disabled unit list preferably located in the non-volatile memory of the base site (step 516). Naturally, since the communication unit was just disabled, access to the communication system is denied (step 518).

Conversely, assuming that decision 512 determines that the communication unit was last enabled within the preferred two day time interval, the present invention operates to allow communication since the user of the communication unit must have recently had the communication unit re-enabled by a service center. By tracking the time interval from enablement (or re-enablement), the present invention allows customers instant access to the communication system without expensive and time consuming data traffic between the control center and the several base sites. In this way, authorized customers gain instant access to the communication system, and service providers are not required to continually update the several base sites to adequately serve their customers.

Referring to FIG. 5c, the data base update (management) begins when the control center contacts a base site via the PSTN (step 520). After communication is established, the base site transmits any update (PIDs of disabled communication units, billing information, etc.) to the control center (step 522). Next, the base site receives (step 524) and stores (step 526) data base updates from the control center (for example, new PID numbers to be disabled or removing PID numbers so that they are not disabled).

Referring to FIG. 6, a simple illustration summarizes the advantages offered by the present invention. When a request to access the communication system 400 is received, a base site need simply to determine the time interval from when the communication unit was last enabled. If the time interval is less than the threshold (i.e., two days in the preferred embodiment), the customer must have recently had his or her communication unit enabled, so access is permitted, even if the customer's communication unit is still on the disable list. Conversely, if the communication unit's PID has not been removed from the disable list via normal procedures, the time interval since the last enablement of the communication unit will exceed the threshold, and that communication unit will be disabled by the base site. Thus, the present invention serves both the customer and the service provider by allowing instant access to the communication system to customers entitled to do so, while requiring only the infrequent data base management illustrated in FIG. 5c to control the operating expenses of the service provider.

We claim:

1. A method for controlling access to a communication system, comprising the base site steps of:
    receiving a signal representing a request from a communication unit to access the communication system, the signal including at least an identification code and another code at least a portion of which represents when the communication unit was authorized to access the communication system;
    processing at least the identification code to initially determine that the communication unit should not be permitted access to the communication system;
    processing at least the other code to determine whether the communication unit was authorized to access the communication system within a time interval; and
    permitting access to the communication system when the base site determines that the communication unit was authorized to access the communication system within the time interval.

2. The method of claim 1, which includes the base site step of not permitting access to the communication system when the base site determines that the communication unit was not authorized to access the communication system within the time interval.

3. The method of claim 2, wherein the step of not permitting access to the communication system includes the step of transmitting a disable signal to the communication unit to prohibit the communication unit from gaining access to the communication system.

4. The method of claim 3, which includes the communication unit step of receiving the disable signal from the base site.

5. The method of claim 4, which includes the communication unit step of storing an indication that the communication unit has been disabled.

6. The method of claim 2, which includes the base site step of storing information indicating that the communication unit has been disabled.

7. The method of claim 6, which includes the step of periodically transmitting the information indicating that the communication unit has been disabled to a central controller.

8. The method of claim 1, which includes the base site step of processing at least the identification code to determine billing information.

9. The method of claim 1, wherein the step of allowing communication includes the step of monitoring communication system usage by the communication unit.

10. The method of claim 1, which includes the step of periodically receiving information representing identification codes of communication units that are to be denied access to the communication system.

11. The method of claim 1, which includes the step of periodically receiving information representing identification codes of communication units that are to be disabled and denied access to the communication system.

12. The method of claim 1, which includes the step of not permitting access to the communication system when the signal representing a request to access the communication system contains an indication that the communication unit was previously disabled.

13. The method of claim 1, wherein the step of processing at least the identification code to initially determine that the communication unit should not be permitted access to the communication system comprises correlating the identification code with one or more identification codes that are to be denied access or disabled.

14. The method of claim 1, wherein the step of processing the other code comprises processing at least the other code to determine whether the communication unit was authorized to access the communication system within a two day time interval.

15. The method of claim 14, wherein the step of permitting access to the communication system when the base site determines that the communication unit was authorized to access the communication system within the time interval.

16. The method of claim 1 including the communication unit step of: transmitting the signal representing a request to access the communication system.

17. The method of claim 16, which includes the communication unit step of receiving an enabling code transmitted from the base site to authorize access to the communication system.

18. The method of claim 17, which includes the communication unit step of determining a time interval from receipt of the enabling code.

19. A method for controlling access to a communication system, comprising the base site steps of:
receiving a signal representing a request from a communication unit to access the communication system, the signal including at least an identification code and another code at least a portion of which represents when the communication unit was authorized to access the communication system;
processing at least the identification code to initially determine that the communication unit should not be permitted access to the communication system;
processing at least the other code to determine whether the communication unit was authorized to access the communication system within a time interval;
permitting access to the communication system when the base site determines that the communication unit was authorized to access the communication system within the time interval; and
not permitting access to the communication system and transmitting a disable signal to the communication unit to prohibit the communication unit from gaining subsequent access to the communication system when the base site determines that the communication unit was not authorized to access the communication system within the time interval.

20. The method of claim 19, wherein the step of processing at least the identification code to initially determine that the communication unit should not be permitted access to the communication system comprises correlating the identification code with one or more identification codes that are to be denied access or disabled.

21. The method of claim 19, wherein the step of processing the other code comprises processing at least the other code to determine whether the communication unit was authorized to access the communication system within a two day time interval.

22. The method of claim 21, wherein the step of permitting access to the communication system when the base site determines that the communication unit was authorized to access the communication system within the time interval.

23. The method of claim 19, which includes the base site step of storing information indicating that the communication unit has been disabled and periodically transmitting the information indicating that the communication unit has been disabled to a central controller.

24. The method of claim 19, which includes the step of periodically receiving information representing identification codes of communication units that are to be disabled and denied access to the communication system.

25. The method of claim 19, which includes the step of not permitting access to the communication system when the signal representing a request to access the communication system contains an indication that the communication unit was previously disabled.

26. A method for controlling access to a communication system, comprising the base site steps of:
periodically receiving information representing identification codes of communication units that are to be disabled;
receiving a signal representing a request from a communication unit to access the communication system, the signal including at least an identification code and another code at least a portion of which represents when the communication unit was authorized to access the communication system;

processing at least the identification code to initially determine that the communication unit should not be permitted access to the communication system by correlating the identification code with one or more identification codes that are to be disabled;

processing at least the other code to determine whether the communication unit was authorized to access the communication system within a two day time interval;

permitting access to the communication system when the base site determines that the communication unit was authorized to access the communication system within the two day time interval;

not permitting access to the communication system and transmitting a disable signal to the communication unit to prohibit the communication unit from gaining subsequent access to the communication system when the base site determines that the communication unit was not authorized to access the communication system within the two day time interval; and storing information indicating that the communication unit has been disabled and periodically transmitting the information indicating that the communication unit has been disabled to a central controller.

27. A communication system capable of controlling access thereto, comprising:

means for receiving a signal representing a request from a communication unit to access the communication system, the signal including at least an identification code and another code at least a portion of which represents when the communication unit was authorized to access the communication system;

means for processing at least the identification code to initially determine that the communication unit should not be permitted access to the communication system, and for processing at least the other code to determine whether the communication unit was authorized to access the communication system within a time interval; and means for permitting access to the communication system when the base site determines that the communication unit was authorized to access the communication system within the time interval.

28. The communication system of claim 27, which includes a communication unit comprising:

means for receiving an enabling code to authorize access to a communication system; and means for transmitting a signal representing a request to access the communication system, the signal including at least an identification code and another code at least a portion of which represents a time interval from when the communication unit was last authorized to access the communication system.

29. The communication system of claim 27, wherein the permitting means includes means for not permitting access to the communication system when the base site determines that the communication unit was not authorized to access the communication system within the time interval.

30. The communication system of claim 29, which includes means for transmitting a disable signal to the communication unit to prohibit the communication unit from gaining access to the communication system.

31. The communication system of claim 30, which includes means for storing information indicating that the communication unit has been disabled.

32. The communication system of claim 29, which includes means for periodically transmitting the information indicating that the communication unit has been disabled to a central controller.

33. The communication system of claim 29, which includes means for periodically receiving information representing identification codes of communication units that are to be disabled.

34. The communication system of claim 29, which includes means for not permitting access to the communication system when the signal representing a request to access the communication system contains an indication that the communication unit was previously disabled.

35. A communication system capable of controlling access thereto, comprising:

means for receiving a signal representing a request from a communication unit to access the communication system, the signal including at least an identification code and another code at least a portion of which represents when the communication unit was authorized to access the communication system;

means for processing at least the identification code to initially determine that the communication unit should not be permitted access to the communication system by correlating the identification code with one or more identification codes that are to be disabled, and for processing at least the other code to determine whether the communication unit was authorized to access the communication system within a two day time interval;

means for permitting access to the communication system when the base site determines that the communication unit was authorized to access the communication system within the two day time interval, and for not permitting access to the communication system and transmitting a disable signal to the communication unit to prohibit the communication unit from gaining subsequent access to the communication system when the base site determines that the communication unit was not authorized to access the communication system within the two day time interval.

* * * * *